(12) United States Patent
Zhao et al.

(10) Patent No.: US 12,190,437 B2
(45) Date of Patent: Jan. 7, 2025

(54) DISPLAY CONTROL METHOD AND APPARATUS, TERMINAL, AND STORAGE MEDIUM

(71) Applicant: Beijing Zitiao Network Technology Co., Ltd., Beijing (CN)

(72) Inventors: Wenhui Zhao, Beijing (CN); Yuwei Zhou, Beijing (CN); Jintao Li, Beijing (CN); Weichu Chen, Beijing (CN); Yan Zhao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/317,594

(22) Filed: May 15, 2023

(65) Prior Publication Data

US 2023/0377248 A1    Nov. 23, 2023

(30) Foreign Application Priority Data

May 17, 2022  (CN) .......................... 202210542315.3

(51) Int. Cl.
*G06T 15/10* (2011.01)
*G06F 3/01* (2006.01)
*G06T 17/00* (2006.01)

(52) U.S. Cl.
CPC .............. *G06T 15/10* (2013.01); *G06F 3/011* (2013.01); *G06T 17/00* (2013.01); *G06F 3/017* (2013.01)

(58) Field of Classification Search
CPC ......... G06T 15/10; G06T 17/00; G06T 19/00; G06F 3/011; G06F 3/017
See application file for complete search history.

(56) References Cited

U.S. PATENT DOCUMENTS

| | | | |
|---|---|---|---|
| 10,621,784 B2* | 4/2020 | Khan | H04N 13/117 |
| 11,294,453 B2* | 4/2022 | Olah-Reiken | G06T 19/006 |
| 2016/0049003 A1* | 2/2016 | Shuster | A63F 13/355 |
| | | | 386/230 |
| 2018/0063501 A1* | 3/2018 | Chen | H04N 21/4788 |
| 2019/0099678 A1* | 4/2019 | Khan | A63F 13/44 |
| 2021/0366174 A1* | 11/2021 | Reilly | H04R 3/005 |
| 2022/0212104 A1* | 7/2022 | Yang | A63F 13/5252 |
| 2022/0343951 A1* | 10/2022 | Levin | G06F 3/011 |
| 2024/0022793 A1* | 1/2024 | Silverstein | G06Q 20/367 |

* cited by examiner

*Primary Examiner* — Jeff Piziali
(74) *Attorney, Agent, or Firm* — Astute IP Law Group (57) ABSTRACT

The present disclosure provides a display control method and apparatus, terminal, and storage medium. In some embodiments, the present disclosure provides a display control method, comprising: presenting a virtual reality space; in response to a first preset event, locating a virtual character of a user to a first-type watching area in the virtual reality space, wherein there is a stage in the virtual reality space, the stage is used to present a real or virtual image of a performer, and the first-type watching area is located on the stage; and displaying an image of the virtual reality space based on a viewing angle of the first-type watching area. This disclosed embodiment can improve the viewing experience.

20 Claims, 4 Drawing Sheets

DISPLAY CONTROL METHOD AND APPARATUS, TERMINAL, AND STORAGE MEDIUM

CROSS-REFERENCE

The present application is proposed based on a Chinese patent application with the application number of 202210542315.3 and the application date of May 17, 2022 and titled "DISPLAY CONTROL METHOD AND APPARATUS, TERMINAL, AND STORAGE MEDIUM", and claims the priority of the Chinese patent application, the disclosures of which are hereby incorporated by reference.

TECHNICAL FIELD

The present disclosure relates to the field of computer technology, in particular to a display control method and apparatus, a terminal, and a storage medium.

BACKGROUND

Virtual reality (VR) is a technology that creates and experiences a virtual world and generates a virtual environment through computations. The virtual reality involves multi-source information, simulates a fused and interactive three-dimensional dynamic visual scenario of a virtual environment and physical behaviors, and allows a user to immerse in the simulated virtual reality environment.

SUMMARY

The present disclosure provides a display control method and apparatus, terminal, and storage medium.

The present disclosure uses the following technical solutions.

In some embodiments, the present disclosure provides a display control method, comprising:
  presenting a virtual reality space;
  in response to a first preset event, locating a virtual character of a user to a first-type watching area in the virtual reality space, wherein there is a stage in the virtual reality space, the stage is used to present a real or virtual image of a performer, and the first-type watching area is located on the stage; and
  displaying an image of the virtual reality space based on a viewing angle of the first-type watching area.

In some embodiments, the present disclosure provides a display control apparatus, comprising:
  a display unit, configured to present a virtual reality space; and
  a control unit, configured to in response to a first preset event, locate a virtual character of a user to a first-type watching area in the virtual reality space, wherein there is a stage in the virtual reality space, the stage is used to present a real or virtual image of a performer, and the first-type watching area is located on the stage, wherein the display unit is further configured to display an image of the virtual reality space based on a viewing angle of the first-type watching area.

In some embodiments, the present disclosure provides a terminal, comprising:
  at least one memory and at least one processor, wherein the at least one memory is configured to store program code, and the at least one processor is configured to call the program code stored in the at least one memory to perform the method above.

In some embodiments, the present disclosure provides a computer-readable storage medium for storing program code, wherein when the program code is executed by a processor, the processor is enabled to perform the method above.

According to the display control method provided in the embodiment of the present disclosure, a virtual character of a user can be located in a first-type watching area, so as to display, for the user, an image of a virtual reality space from a viewing angle of the first-type watching area. In this case, the user can watch a performance from a viewing angle of a performer and watch the performer at a close range, thereby improving user's watching experience.

BRIEF DESCRIPTION OF THE DRAWINGS

These and other features, advantages and aspects of embodiments of the present disclosure will become more apparent in conjunction with the accompanying drawings and with reference to the following specific embodiments. Throughout the accompanying drawings, identical or similar appended marks indicate identical or similar elements. It should be understood that the accompanying drawings are schematic and that the elements and components are not necessarily drawn to scale.

These and other features, advantages and aspects of embodiments of the present disclosure will become more apparent in conjunction with the accompanying drawings and with reference to the following specific embodiments. Throughout the accompanying drawings, identical or similar appended marks indicate identical or similar elements. It should be understood that the accompanying drawings are schematic and that the elements and components are not necessarily drawn to scale.

DETAILED DESCRIPTION OF PREFERRED EMBODIMENTS

Embodiments of the present disclosure will be described in greater detail below with reference to the accompanying drawings. While certain embodiments of the present disclosure are shown in the accompanying drawings, it should be understood that the present disclosure may be implemented in various forms and should not be construed as being limited to the embodiments set forth herein, but instead are provided for a more thorough and complete understanding of the present disclosure. It should be understood that the accompanying drawings and embodiments of the present disclosure are for exemplary purposes only and are not intended to limit the scope of protection of the present disclosure.

It should be understood that the individual steps documented in the method embodiments of the present disclosure may be performed in sequence and/or in parallel. In addition, the method embodiments may include additional steps and/or omit to perform the steps illustrated. The scope of the present disclosure is not limited in this regard.

As used herein, the term "comprising" and variations thereof are open-ended, i.e., "comprising, but not limited to". The term "based on" is "based, at least in part, on". The term "an embodiment" means "at least one embodiment"; the term "another embodiment" means "at least one additional embodiment"; the term "some embodiments" means "at least some embodiments". Definitions of other terms will be given in the description below.

Note that the concepts "first" and "second" mentioned in this disclosure are used only to distinguish between different devices, modules or units, and are not intended to define the order or interdependence of the functions performed by these devices, modules or units.

It should be noted that the reference to "one" in this disclosure is intended to be schematic and not limiting, and it should be understood by those skilled in the art to mean "one or more" unless the context clearly indicates otherwise.

The names of the messages or information interacting between the multiple devices in this disclosure are for illustrative purposes only and are not intended to limit the scope of those messages or information.

The embodiments of the present application are described in detail below in conjunction with the accompanying drawings.

Figure 1:
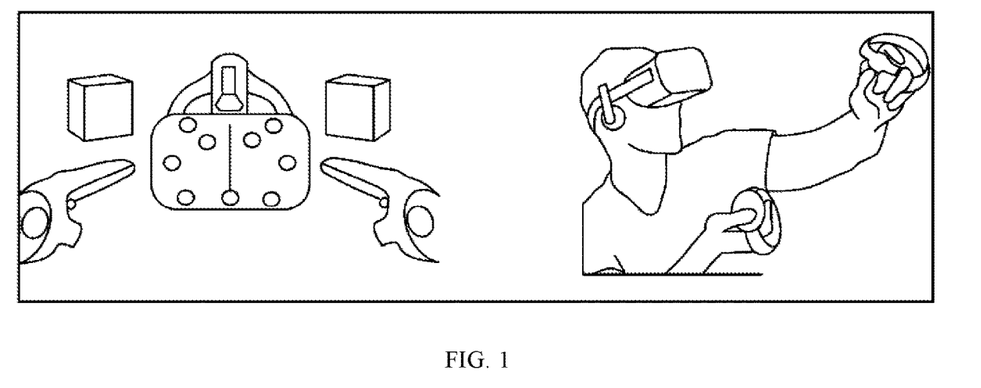
FIG. 1 is a schematic diagram of a virtual reality device according to an embodiment of the present disclosure.

As shown in FIG. 1, a user may enter a virtual reality space through an intelligent terminal device such as head-mounted VR glasses, and control user's own virtual character (virtual character) in the virtual reality space to engage in social interaction, entertainment, learning, remote office, and the like with a virtual character controlled by another user.

The virtual reality space may be a simulated environment, a semi-simulated and semi-fictional virtual scenario, or an entirely fictional virtual scenario of the real world. The virtual scenario may be any of a two-dimensional virtual scenario, a 2.5-dimensional virtual scenario, or a three-dimensional virtual scenario. Embodiments of the present application do not limit dimensions of the virtual scenario. For example, the virtual scenario may include sky, land, ocean, and the like. The land may include environmental elements such as deserts and cities. A user may control a virtual object to move in the virtual scenario.

In one embodiment, in the virtual reality space, the user may implement relevant interactive operations through a controller. The controller may be a handle. For example, the user may perform relevant operation control by operating keys of the handle. In other embodiments, the target object in the virtual reality device may be controlled by using gestures, speech, or multi-modal control methods instead of the controller.

In one embodiment, with the development of virtual reality technology, a performer may use this technology for virtual reality performance, for example, hold a virtual reality concert, and an audience uses a virtual reality device to obtain an experience similar to a real concert in an immersive manner. For example, a virtual reality space model for a performer is built through the virtual reality technology, and a virtual reality environment of a concert may be computed and generated based on the space. In addition, technologies including auditory perception, tactile perception, motion perception, even taste perception and olfactory perception, and the like may be provided to simulate a fused and interactive three-dimensional dynamic visual scenario of the virtual environment and physical behaviors, so that a user immerses in the simulated virtual reality environment. In this case, the performer may perform in the virtual reality environment, and the user who wears a virtual reality device may enter the scenario of the concert and interact with the performer through relevant perception technologies to listen to a music feast, thereby obtaining an immersive and realistic concert experience.

In some embodiments of the present disclosure, a display control method is provided. The display control method may be used for a virtual reality device. The virtual reality device is a terminal that implements a virtual reality effect, and is generally provided in a form of glasses, a head mount display (HMD), or contact lenses to implement visual perception and other forms of perception. The form of implementation of the virtual reality device is not limited here, and the virtual reality device may be further miniaturized or enlarged as needed.

The virtual reality device described in the embodiments of the present disclosure may include but is not limited to the following types:

A personal computer virtual reality (PCVR) device. The PCVR device performs related computations and data output of virtual reality functions by using a PC, and an external PCVR device implements virtual reality effects by using the data output by the PC.

A mobile virtual reality device. The mobile virtual reality device supports settings of a mobile terminal (such as a smart phone) in various ways (for example, a head-mounted display with a dedicated card slot), and is connected with the mobile terminal in a wired or wireless manner, where the mobile terminal performs related computations of virtual reality functions and outputs data to the mobile virtual reality device, for example, watching a virtual reality video through an APP of the mobile terminal.

An all-in-one virtual reality device. The all-in-one virtual reality device has a processor for related computations of virtual reality functions, and therefore, has independent virtual reality input and output functions, does not need to be connected to a PC or a mobile terminal, and has a high degree of freedom of use.

With the development of virtual reality technology, people have begun to use the virtual reality technology for virtual performances. When a virtual performance is held, a performance area and a watching area are first built, where the watching area and the performance area are separated from each other, a performer or a virtual character of a performer is displayed in the performance area, a virtual character of an audience user is displayed in the watching area, and the user may move in the watching area, but cannot enter the performance area. The audience user cannot watch the performance at a close range, watch the entire performance venue from a viewing angle of the performer, or engage in real-life interactions such as shaking hands with the performer. On the one hand, the watching experience of the audience user is greatly limited, and the audience user cannot experience from the angle of the performer. On this basis, some embodiments of the present disclosure aims to further enhance user's immersive experience, allow a user to watch a performance at a close range on a stage and interact more realistically with a performer, and enable the user to experience a more consistent experience with a real performance venue. In order to improve user experience partially at least, the present disclosure provides a display control method.

Figure 2:
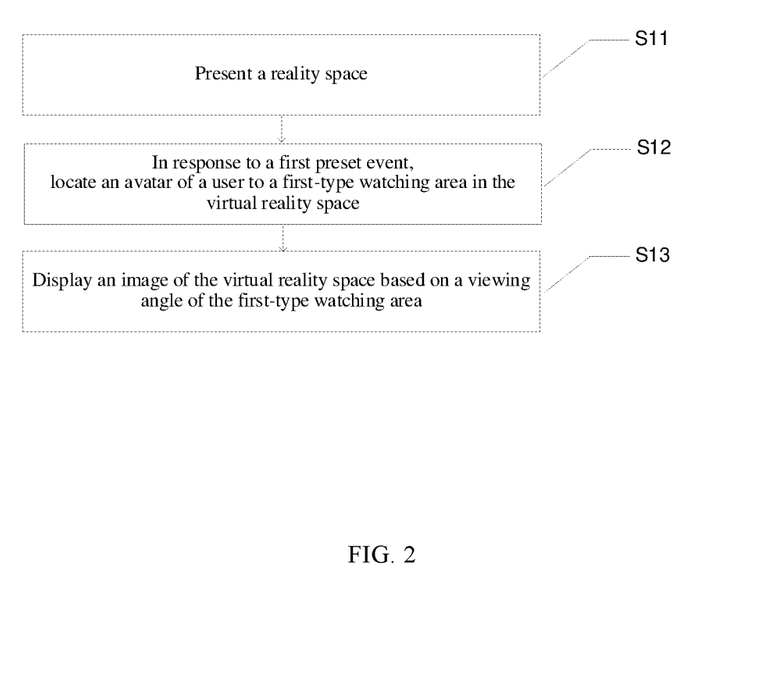
FIG. 2 is a flowchart of a display control method according to an embodiment of the present disclosure.

FIG. 2 shows a flowchart of a display control method according to an embodiment of the present disclosure, including the following steps.

S11: Present a virtual reality space.

In some embodiments, the virtual reality space may be presented to a user when the user uses a virtual reality device.

S12: In response to a first preset event, locate a virtual character of a user to a first-type watching area in the virtual reality space.

In some embodiments, the virtual character is a role controlled by the user, and may be a user-defined virtual character, a virtual character may be generated according to a user's real image, or the like, which is not limited. The virtual character is displayed in the virtual reality space, and the user may view the virtual reality space by wearing the virtual reality device. Locating the virtual character of the user to the first-type watching area may move the virtual character of the user from another location to the first-type watching area. There is a stage in the virtual reality space, and the stage is used to present a real or virtual image of a performer. The stage may be a platform, and the performer may be a host, singer, dancer, or the like, which are not limited. In some embodiments, the first-type watching area is located on the stage.

S13: Display an image of the virtual reality space based on a viewing angle of the first-type watching area.

Figure 3:
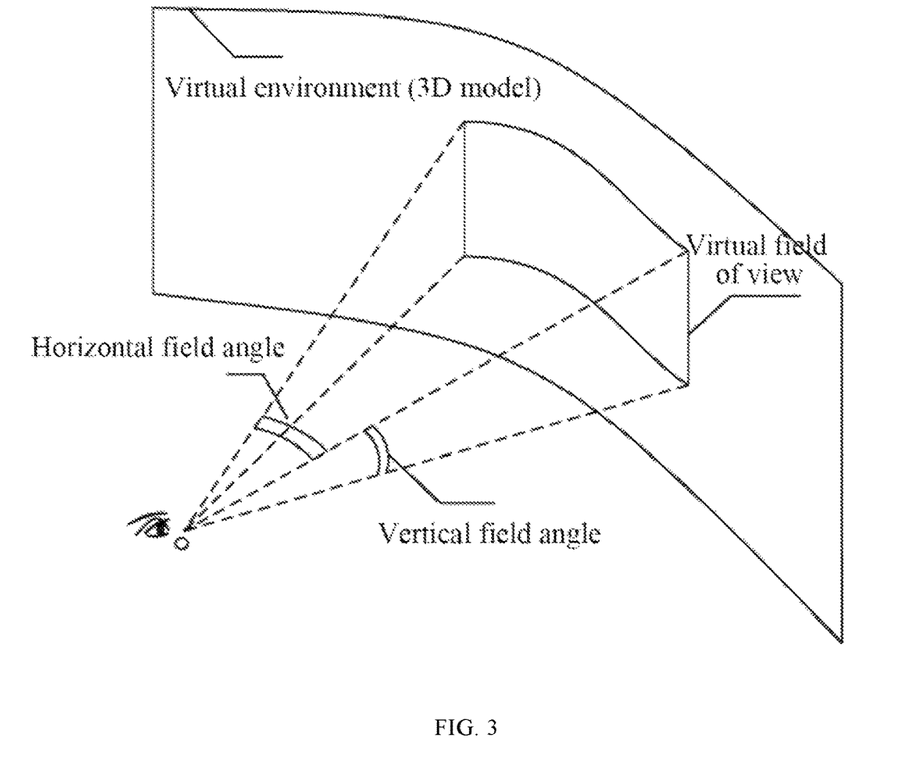
FIG. 3 is a schematic diagram of display of a virtual reality space according to an embodiment of the present disclosure.

In some embodiments, the viewing angle of the first-type watching area may be preset, and may be similar to the viewing angle of the performer. Therefore, when the virtual character of the user is located on the first-type watching area, the image of the virtual reality space at the viewing angle of the first-type watching area is displayed for the user, so that the user can watch from the viewing angle of the performer. In some embodiments, as shown in FIG. 3, the virtual character of the user has a horizontal field angle and a vertical field angle in the first-type watching area, and the user can watch an image of a virtual environment in a virtual field of view. The horizontal field angle and the vertical field angle in the present disclosure are not limited, and may be either 180 degrees or 360 degrees. That is, in some embodiments, an entire 360-degree surrounding environment may be viewed when the virtual character of the user is located in the first-type watching area.

Figure 4:
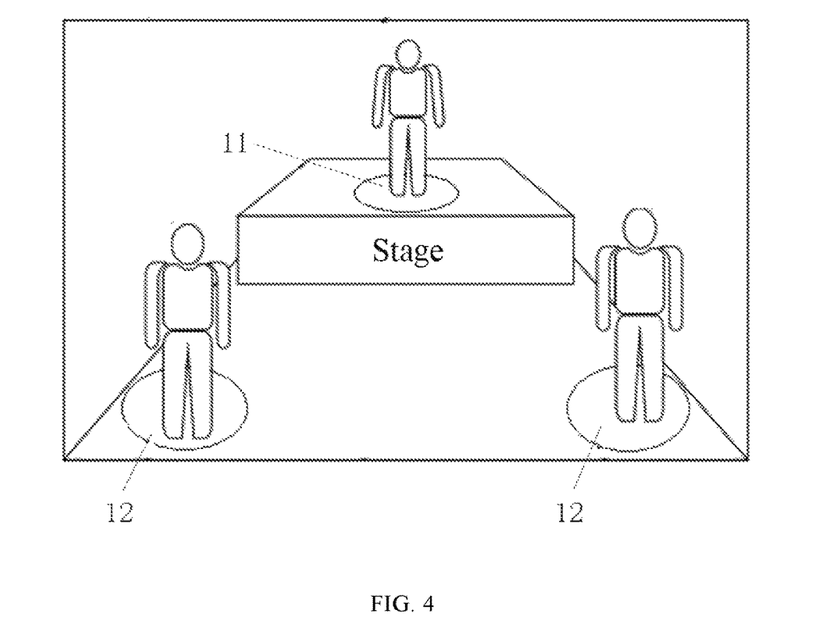
FIG. 4 is a schematic diagram of a first-type watching area and a second-type watching area according to an embodiment of the present disclosure.

In order to better illustrate the method provided in the present disclosure, a specific embodiment is provided with reference to FIG. 4. In this embodiment, the virtual reality space may be a virtual concert venue, and there is a stage in the virtual reality space. An image (not shown in FIG. 4) of a performer in the virtual concert venue, such as a singer or a dancer, is located on the stage. The image of the performer may be a real image, for example, the real image of the performer may be captured by a camera and fused into the virtual reality space to achieve the same effect as a real concert. There are watching areas in the virtual concert, and the watching areas include a first-type watching area 11 on the stage and second-type watching areas 12 outside the stage. When the virtual character of the user is located in different watching areas, images of the virtual reality space at different viewing angles may be displayed for the user. In the embodiment of the present disclosure, the first preset event is pre-defined. The user executes the first preset event to move the virtual character of the user to the first-type watching area which is located on the stage, so that the user can watch the entire concert from the viewing angle of the performer on the stage, watch the concert at a close range on the stage to achieve close contact with the performer and improve the watching experience, and obtain a watching experience that is rarely achievable on the stage in real environments. In addition, when the image of the performer is a real one, the user can watch the concert at a position close to the performer.

In some embodiments of the present disclosure, as shown in FIG. 4, at least two watching areas are preset in the virtual reality space, including a first-type watching area 11 and at least one second-type watching area 12; the second-type watching area 12 is located outside the stage; and when the virtual character of the user is located in the second-type watching area 12, the image of the virtual reality space is displayed based on a viewing angle of the second-type watching area 12.

In some embodiments, a plurality of watching areas may be preset in the virtual reality space. The first-type watching area 11 is located on the stage, and may allow close watching of the performer and watching of the virtual reality space from the viewing angle of the performer. The second-type watching area 12 is located outside the stage for watching the image of the virtual reality space from the viewing angle of a normal audience, for example, watching the stage and the performer thereon. There may be one, two, or more watching areas 12 of the second type, and the virtual character of the user may move between different watching areas to switch the watching angle to watch the performer. The virtual reality space is a concert venue as an example. The second-type watching area 12 may be located under the stage in the virtual concert venue. The distances and angles between different second-type watching areas and the stage may be different. When the virtual character of the user is located in the second-type watching area, the user may watch the stage and the image of the performer on the stage from the corresponding angle, so as to obtain different watching experiences. When the virtual character of the user is in a watching area, the watched image of the performer in the virtual reality space may be computed according to the viewing angle and distance of the watching area, so as to ensure the same viewing effect as in the real environment. A watching area may accommodate virtual characters of one or more users.

In some embodiments of the present disclosure, the virtual reality space includes a virtual reality environment and a target image displayed in the virtual reality environment, where the target image is an image obtained based on a stage in a real space and the real image of the performer; and the first-type watching area is located on the stage displayed in the target image. For example, the target image may be a video image or an image produced by simulation based on motion capture technology, which is not excessively limited in the embodiment of the present disclosure.

In some embodiments of the present disclosure, when the virtual reality space is built, a virtual reality environment may be built, where the virtual reality environment includes a spherical space that may be 180 degrees or 360 degrees. In some embodiments, the target image displayed in the virtual reality environment may be a real image of a performer captured in a real space, the target image includes a stage in a real environment, and the first-type watching area is located on the stage in the target image. In another embodiment, when the virtual reality space is built, an image of a performer and a simulated reality space where the performer is located (such as a stage) may be obtained through technologies such as real environment simulation and character action simulation. In some embodiments of the present disclosure, the virtual character of the user is moved onto the stage in the target image, so that the watching experience of the user is more realistic, and the user experience is better improved. In some embodiments of the present disclosure, the image of the virtual reality space is not simply an image of a virtual model, but is formed by combining a real image of a real environment with a virtual model image, and includes both content of the real environment and content of the virtual environment. By combining the content of the real environment, a more realistic display is implemented. In addition, the virtual character is moved onto the stage in the target video image of the real environment, so as to achieve an immersive experience. In some embodiments, an image at the viewing angle of the first-type watching area may be captured by using a camera at a predetermined position on the stage in the real environment, and the captured image may be displayed when the virtual character of the user is located in the first-type watching area. In some embodiments, the second-type watching area is located in the virtual reality environment.

In other embodiments of the present disclosure, the virtual reality space includes a virtual reality environment and a target image, the target image includes a real image of a performer, and the target image is displayed at a virtual stage built in the virtual reality environment. In some embodiments of the present disclosure, a virtual stage may alternatively be used in the virtual reality space. In other embodiments, the target image includes a stage in a real space, there is a virtual stage in the virtual reality environment, and the stage in the virtual reality space is partially the stage in the target image, and partially the virtual stage, thereby achieving a mixture of virtuality and reality. In this case, the first-type watching area may be located on the virtual stage or the stage in the target image. Alternatively, there may be a plurality of first-type watching areas, different first-type watching areas may be located on the virtual stage and the stage in the target image respectively, and the position of the virtual character of the user may be switched between the different first-type watching areas.

In some embodiments of the present disclosure, the displaying an image of the virtual reality space based on a viewing angle of the first-type watching area includes at least one of the following: displaying the real or virtual image of the performer; hiding other virtual characters of other users located in the first-type watching area 11; and displaying other virtual characters of other users located in the second-type watching area 12.

In some embodiments, when the virtual character of the user is located in the first-type watching area, the real or virtual image of the performer needs to be displayed to watch a performance. In some embodiments, the virtual reality image matched by the user does not display other virtual characters of other users who are also located in the first-type watching area. In other embodiments, a plurality of different users may be located in the same virtual reality space, and virtual characters of two or more users may be moved to the first-type watching area. However, in order to ensure the watching experience of the user in the first-type watching area, the virtual characters of other users who are also located in the first-type watching area are not displayed. In some embodiments, other virtual characters of other users located in the second-type watching area 12 are displayed. Therefore, when the virtual character of the user is located in the first-type watching area 11, the user may view other virtual characters of other users outside the stage, and experience the feeling of viewing the performance venue from the viewing angle of the performer.

In some embodiments of the present disclosure, when the virtual character of the user is located in a watching area, the method further includes: in response to a movement event, moving within the watching area where the virtual character of the user is located. The movement event may include, for example, a gesture operation or a virtual option operation. Within a watching area, the virtual character of the user may perform movements such as turning and walking, so as to change the viewing angle in the watching area to view different scenes. In some embodiments, when the virtual character of the user is located in a watching area, the method further includes: switching the virtual character of the user from the current watching area to another watching area in response to a switching event, where another watching area may be a watching area selected in the user's switching event. The switching event may include, for example, the first preset event. The virtual character of the user may switch between different watching areas, so as to change the viewing angle and watch the performer from different positions.

In some embodiments of the present disclosure, the displaying an image of the virtual reality space based on a viewing angle of the second-type watching area 12 includes at least one of the following: displaying a real or virtual image of a performer; hiding other virtual characters of other users located in the first-type watching area 11; and displaying other virtual characters of other users located in the second-type watching area 12.

In some embodiments, when the virtual character of the user is located in the second-type watching area 12, the image of the performer can be displayed to watch a performance. In some embodiments, other virtual characters of other users located in the first-type watching area 11 are not displayed. Because the first-type watching area 11 is located on the stage, displaying other virtual characters may block the performer, resulting in poor user experience. In some embodiments, displaying other virtual characters of other users located in the second-type watching area 12 may provide a better watching atmosphere. For example, if the virtual reality space is a virtual concert venue, displaying other virtual characters of other users who are also located in the virtual concert venue can better heighten the atmosphere of the concert venue.

In some embodiments of the present disclosure, when the virtual character of the user is located in the first-type watching area 11, a virtual interaction option is displayed, where the virtual interaction option is used to interact with the real or virtual image of the performer. In some embodiments, the virtual interaction option may include, for example, presenting flowers to the performer, or shaking hands or hugging with the real or virtual image of the performer. The virtual character of the user may trigger the virtual interaction option to interact with the real or virtual image of the performer. The number of the virtual option may be one or more. The virtual character of the user located in the first-type watching area may be displayed for other users when the virtual character of the user interacts with the real or virtual image of the performer, and may be hidden after the interaction is completed. Similarly, other virtual characters of other users located in the first-type watching area may be displayed when the other virtual characters of the other users interact with the real or virtual image of the performer, and may be hidden after the interaction is completed. In this case, interactions similar to real scenarios may be better implemented.

In some embodiments of the present disclosure, when the virtual character of the user is located in the second-type watching area, the virtual interaction option is hidden. In some embodiments, the virtual character of the user, when located in the second-type watching area, is located outside the stage and therefore cannot interact with the real or virtual image of the performer, so the virtual interaction option is hidden.

In some embodiments of the present disclosure, the virtual character of the user is located in the second-type watching area before responding to the first preset event, and the virtual character of the user is moved from the second-type watching area 12 to the first-type watching area 11 in response to the first preset event. In some embodiments, the virtual character of the user is located in the second-type watching area 12 before the first preset event, and the virtual character of the user moves from the second-type watching area 12 to the first-type watching area 11 in response to first preset time, that is, the virtual character of the user may move between the second-type watching area 12 and the first-type watching area 11.

In some embodiments, after displaying the image of the virtual reality space based on the viewing angle of the first-type watching area 11, the method further includes: moving the virtual character from the first-type watching area 11 to the second-type watching area 12 in response to a second preset event. That is, the virtual character of the user may be moved back from the first-type watching area 11 to the second-type watching area 12.

In some embodiments of the present disclosure, the display control method further includes: displaying a transition screen from one watching area to another when the virtual character of the user moves from the watching area to another, or displaying a preset screen.

In some embodiments, the virtual character of the user may move from one watching area to another, for example, from the first-type watching area 11 to the second-type watching area 12, from the second-type watching area 12 to the first-type watching area 11, or from one second-type watching area 12 to another second-type watching area 12. A transition animation may be displayed in the moving process. Specific content of the transition animation may depend on a starting position and a target position, for example, display a process that the virtual character of the user walks from one watching area to another. In other embodiments, a preset screen may be displayed, where the preset screen may be arbitrarily preset, for example, a teleport screen is displayed to indicate a movement process.

In some embodiments of the present disclosure, the first preset event includes: a preset gesture operation, an operation on a virtual device worn by the virtual character, an operation on a virtual option, or input of a preset audio instruction. In some embodiments, the user may wear or hold an experience device to perform the preset gesture operation in the real space, so as to locate the virtual character of the user to the first-type watching area 11. In another embodiment, the virtual character of the user may be mounted with a virtual device. The virtual device may be, for example, a bracelet. The user controls the virtual character to trigger the virtual device so as to locate the virtual character to the first-type watching area 11. In some embodiments, a virtual option such as a virtual control panel may be displayed around the virtual character of the user, and the user controls the virtual character to trigger the virtual option so as to locate the virtual character to the first-type watching area 11.

In some embodiments of the present disclosure, a model of a watching area is built in the virtual reality space in advance, and at least one video stream corresponding to the model of the watching area is set.

In some embodiments, when the virtual reality space is created, corresponding models are built for different watching areas. Different watching areas have respective corresponding video streams, and the number of video streams may be one or more. For a watching area, viewing angles of different video streams may be different, so that images from different viewing angles may be watched through more video streams. When the virtual character of the user is located in the watching area, the virtual character of the user may change its orientation, the corresponding video stream is determined based on the orientation of the virtual character of the user, and the determined video stream is displayed as the image of the virtual reality space. For example, when the virtual character of the user is located in the first-type watching area, the video stream corresponding to the first-type watching area is displayed as the image of the virtual reality space based on the orientation of the virtual character of the user. When the virtual character of the user is located in the second-type watching area, the video stream corresponding to the second-type watching area is displayed as the image of the virtual reality space based on the orientation of the virtual character of the user. In some embodiments of the present disclosure, the response speed can be accelerated by establishing corresponding video streams for each watching area in advance. Because there are a large number of models in the virtual reality space, if the models are loaded and images are generated based on the models, a lot of resources will be consumed, and crash may occur easily. Therefore, video streams are displayed in this embodiment to increase the loading speed and ensure user experience.

In order to better illustrate the method provided in the embodiment of the present disclosure, a specific embodiment is provided below. In this embodiment, cameras are disposed in advance at a plurality of locations in a performance venue, including a stage, of a real environment. Each location corresponds to a watching area in a virtual reality space, including a first-type watching area 11 and second-type watching areas 12. Different cameras capture video streams corresponding to each watching area, where a camera corresponding to the first-type watching area is disposed on the stage. The performance venue is simulated in the virtual reality space, and captured real images of the stage and a performer are fused into the virtual reality space. A virtual character of a user may be moved to the first-type watching area 11 in the virtual reality space by executing a first preset event, for example, triggering a virtual bracelet of the virtual character. Because the camera corresponding to the first-type watching area 11 is on a real stage in a real environment, the user can watch an image that can be watched on the real stage, which achieves close watching of the performer. Moreover, the virtual character of the user can move its viewing angle in the first-type watching area 11 to watch the performance venue from a viewing angle of the performer, and can interact with a real or virtual image of the performer through a virtual interaction option. The virtual character of the user may return from the first-type watching area 11 to the second-type watching area 12, or may switch between the second-type watching areas 12.

In some embodiments of the present disclosure, in order to better simulate the atmosphere of the performance venue, cheers of users in the real environment may be played in the virtual reality space. In some embodiments, photos may be automatically taken as user mementos when the virtual character of the user interacts with the real or virtual image of the performer. In some embodiments, the user may set a quantity of displayed virtual characters of other virtual users or set a displayed range in the virtual reality space to avoid crash caused by loading too many virtual characters or too large virtual reality space. In some embodiments of the present disclosure, virtual characters that the virtual character of the user does not watch may not be loaded, so as to improve processing speed without reducing user experience.

In some embodiments of the present disclosure, a display control apparatus is provided, including:

a display unit, configured to present a virtual reality space; and a control unit, configured to in response to a first preset event, locate a virtual character of a user to a first-type watching area in the virtual reality space, where there is a stage in the virtual reality space, the stage is used to present a real or virtual image of a performer, and the first-type watching area is located on the stage, where the display unit is further configured to display an image of the virtual reality space based on a viewing angle of the first-type watching area.

In some embodiments, the virtual reality space includes a virtual reality environment and a target image displayed in the virtual reality environment, where the target image is an image obtained based on a stage in a real space and the real image of the performer; and the first-type watching area is located on the stage displayed in the target image.

In some embodiments, at least two watching areas are preset in the virtual reality space, including a first-type watching area and at least one second-type watching area; the second-type watching area is located outside the stage; and when the virtual character of the user is located in the second-type watching area, the image of the virtual reality space is displayed based on a viewing angle of the second-type watching area.

In some embodiments, displaying an image of the virtual reality space based on a viewing angle of the first-type watching area includes at least one of the following:

displaying the real or virtual image of the performer;

hiding other virtual characters of other users located in the first-type watching area; and displaying other virtual characters of other users located in the second-type watching area.

In some embodiments, displaying an image of the virtual reality space based on a viewing angle of the second-type watching area includes at least one of the following:

displaying the real or virtual image of the performer;

hiding other virtual characters of other users located in the first-type watching area; and displaying other virtual characters of other users located in the second-type watching area.

In some embodiments, the control unit is further configured to display a virtual interaction option when the virtual character of the user is located in the first-type watching area, where the virtual interaction option is used to interact with the real or virtual image of the performer; or hide the virtual interaction option when the virtual character of the user is located in the second-type watching area.

In some embodiments, the virtual character of the user is located in the second-type watching area before responding to the first preset event, and the virtual character of the user is moved from the second-type watching area to the first-type watching area in response to the first preset event; and/or, the control unit is further configured to move the virtual character from the first-type watching area to the second-type watching area in response to a second preset event after the image of the virtual reality space is displayed based on the viewing angle of the first-type watching area.

The display unit is further configured to display a transition screen from one watching area to another when the virtual character of the user moves from the watching area to another, or displaying a preset screen.

In some embodiments, the first preset event includes: a preset gesture operation, an operation on a virtual device worn by the virtual character, an operation on a virtual option, or input of a preset audio instruction.

In some embodiments, the control unit builds a model of a watching area in the virtual reality space in advance, and sets at least one video stream corresponding to the model of the watching area; and when the virtual character of the user is located in the watching area, the display unit displays the image of the virtual reality space based on an orientation of the virtual character of the user.

For embodiments of the apparatus, which correspond essentially to the method embodiment, it is sufficient to refer to the partial description of the method embodiment where relevant. The above described embodiments of the apparatus are only schematic, where the modules described as separate modules may or may not be separate. Some or all of these modules may be selected according to practical needs to achieve the purpose of this embodiment solution. It can be understood and implemented by a person of ordinary skill in the art without creative labor.

Above, the method and apparatus of the present disclosure are described based on embodiments and application examples. In addition, the present disclosure provides a terminal and a storage medium, which are described below.

Figure 5:
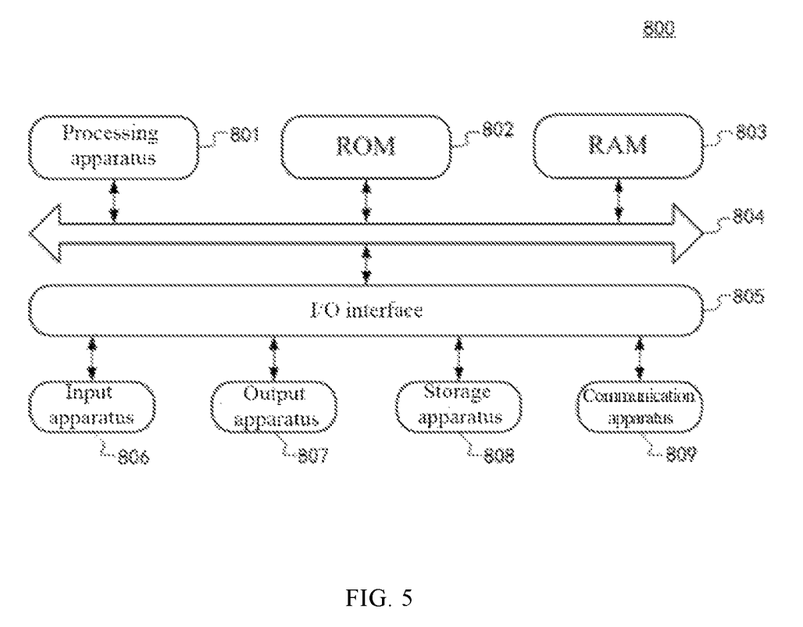
FIG. 5 is a schematic structural diagram of an electronic device according to an embodiment of the present disclosure.

Reference is made below to FIG. 5, which illustrates a schematic diagram of a structure of an electronic device (e.g., a terminal device or a server) 800 suitable for implementing an embodiment of the present disclosure. Terminal devices in embodiments of the present disclosure may include, but are not limited to, mobile terminals such as cell phones, laptop computers, digital broadcast receivers, PDAs (personal digital assistants), PADs (tablet computers), PMPs (portable multimedia players), vehicle terminals (e.g., vehicle navigation terminals), and the like, and fixed terminals such as digital TVs, desktop computers, and the like. The electronic device illustrated in the figures is only an example and should not impose any limitation on the functionality and scope of use of embodiments of the present disclosure.

As shown in FIG. 5, the electronic device 800 may include a processing apparatus (e.g., central processor, graphics processor, etc.) 801 that may perform various appropriate actions and processes based on programs stored in read-only memory (ROM) 802 or loaded into random access memory (RAM) 803 from the storage device 808. Also stored in RAM 803 are various programs and data required for the operation of electronic device 800. The processing apparatus 801, ROM 802, and RAM 803 are connected to each other via bus 804. The input/output (I/O) interface 805 is also connected to the bus 804.

Typically, the following devices can be connected to I/O interface 805: input apparatus 806 including, for example, touch screens, touch pads, keyboards, mice, cameras, microphones, accelerometers, gyroscopes, etc.; output apparatus 807 including, for example, liquid crystal displays (LCDs), speakers, vibrators, etc.; storage apparatus 808 including, for example, magnetic tapes, hard drives, etc.; and communication apparatus 809.

Communication apparatus 809 may allow the electronic device 800 to communicate wirelessly or wired with other devices to exchange data. Although the drawings illustrate the electronic device 800 with various devices, it should be understood that it is not required to implement or have all of the devices illustrated. More or fewer devices may alternatively be implemented or available.

In particular, according to embodiments of the present disclosure, the process described above with reference to the flowchart may be implemented as a computer software program. For example, embodiments of the present disclosure include a computer program product comprising a computer program carried on a computer readable medium, the computer program comprising program code for performing the method shown in the flowchart. In such an embodiment, the computer program may be downloaded and installed from a network via a communication apparatus 809, or from a storage apparatus 808, or from a ROM 802. When this computer program is executed by the processing apparatus 801, the above-described functions as defined in the method of this disclosed embodiment are performed.

It is to be noted that the computer-readable medium described above in this disclosure may be a computer-readable signal medium or a computer-readable storage medium or any combination of the above. The computer readable storage medium may be, for example—but not limited to—an electrical, magnetic, optical, electromagnetic, infrared, or semiconductor system, device, or device, or any combination of the above. More specific examples of computer-readable storage media may include, but are not limited to: electrically connected with one or more wires, portable computer disks, hard disks, random access memory (RAM), read-only memory (ROM), erasable programmable read-only memory (EPROM or flash memory), optical fiber, portable compact disk read-only memory (CD-ROM), optical storage devices, or any of the above, magnetic memory devices, or any suitable combination of the foregoing. In the present disclosure, a computer-readable storage medium may be any tangible medium that contains or stores a program that may be used by or in combination with an instruction execution system, device, or device. And in the present disclosure, a computer-readable signal medium may include a data signal propagated in the baseband or as part of a carrier wave that carries computer-readable program code. Such propagated data signals may take a variety of forms, including but not limited to electromagnetic signals, optical signals, or any suitable combination of the foregoing. Computer-readable signal medium can also be any computer-readable medium other than computer-readable storage media, the computer-readable signal medium can send, propagate or transmit the program for use by or in combination with the instruction execution system, device or device. The program code contained on the computer-readable medium may be transmitted using any suitable medium, including but not limited to: wire, fiber optic cable, RF (radio frequency), etc., or any suitable combination of the above.

In some implementations, the client, server may communicate using any currently known or future developed network protocol such as HTTP (HyperText Transfer Protocol), and may interconnect with any form or medium of digital data communication (e.g., a communication network). Examples of communication networks include local area networks ("LANs"), wide area networks ("WANs"), inter-networks (e.g., the Internet), and end-to-end networks (e.g., ad hoc end-to-end networks), as well as any currently known or future developed networks.

The above computer-readable medium may be contained in the above electronic device; or it may be present separately and not assembled into the electronic device.

The above computer readable medium carries one or more programs which, when executed by the electronic device, cause the electronic device to perform the methods of the present disclosure as described above.

Computer program code for performing the operations of the present disclosure may be written in one or more programming languages or combinations thereof, including object-oriented programming languages—such as Java, Smalltalk, C++, and also including conventional procedural programming languages—such as "C" language or similar programming languages. The program code may be executed entirely on the user's computer, partially on the user's computer, as a stand-alone package, partially on the user's computer and partially on a remote computer, or entirely on a remote computer or server. In the case of a remote computer, the remote computer may be connected to the user computer over any kind of network—including a local area network (LAN) or a wide area network (WAN)—or, alternatively, may be connected to an external computer (e.g., using an Internet service provider to connect over the Internet).

The flowcharts and block diagrams in the accompanying drawings illustrate the possible implementations of the architecture, functionality, and operation of systems, methods, and computer program products in accordance with various embodiments of the present disclosure. At this point, each box in a flowchart or block diagram may represent a module, program segment, or portion of code that contains one or more executable instructions for implementing a specified logical function. It should also be noted that in some implementations as replacements, the functions indicated in the boxes may also occur in a different order than that indicated in the accompanying drawings. For example, two boxes represented one after the other can actually be executed in substantially parallel, and they can sometimes be executed in the opposite order, depending on the function involved. Note also that each box in the block diagram and/or flowchart, and the combination of boxes in the block diagram and/or flowchart, may be implemented with a dedicated hardware-based system that performs the specified function or operation, or may be implemented with a combination of dedicated hardware and computer instructions.

The units described in the embodiments of the present disclosure may be implemented by means of software, or by means of hardware. Wherein, the name of the unit does not in some cases constitute a limitation on the unit itself.

The functions described above herein may be performed, at least in part, by one or more hardware logic components. For example, non-limitingly, exemplary types of hardware logic components that may be used include: field-programmable gate arrays (FPGAs), application-specific integrated circuits (ASICs), application-specific standard products (ASSPs), systems-on-chip (SOCs), complex programmable logic devices (CPLDs), and the like.

In the context of the present disclosure, a machine-readable medium may be a tangible medium that may contain or store a program for use by or in conjunction with an instruction execution system, device, or apparatus. The machine-readable medium may be a machine-readable signal medium or a machine-readable storage medium. Machine readable media may include, but are not limited to, electronic, magnetic, optical, electromagnetic, infrared, or semiconductor systems, devices, or equipment, or any suitable combination of the foregoing. More specific examples of machine-readable storage media would include one or more wire-based electrical connections, portable computer disks, hard disks, random access memory (RAM), read-only memory (ROM), erasable programmable read-only memory (EPROM or flash memory), optical fiber, convenient compact disk read-only memory (CD-ROM), optical storage devices, magnetic storage devices, or any suitable combination of the above any suitable combination of the above.

According to one or more embodiments of the disclosure, provide a display control method, comprising:
presenting a virtual reality space;
in response to a first preset event, locating a virtual character of a user to a first-type watching area in the virtual reality space, wherein there is a stage in the virtual reality space, the stage is used to present a real or virtual image of a performer, and the first-type watching area is located on the stage; and
displaying an image of the virtual reality space based on a viewing angle of the first-type watching area.

According to one or more embodiments of the disclosure, provide a display control method, wherein the virtual reality space comprises a virtual reality environment and a target image displayed in the virtual reality environment, wherein the target image is an image obtained based on a stage in a real space and the real image of the performer; and
the first-type watching area is located on the stage displayed in the target image.

According to one or more embodiments of the disclosure, provide a display control method, wherein at least two watching areas are preset in the virtual reality space, comprising a first-type watching area and at least one second-type watching area; the second-type watching area is located outside the stage; and when the virtual character of the user is located in the second-type watching area, the image of the virtual reality space is displayed based on a viewing angle of the second-type watching area.

According to one or more embodiments of the disclosure, provide a display control method, wherein the displaying an image of the virtual reality space based on a viewing angle of the first-type watching area comprises at least one of the following:
displaying the real or virtual image of the performer;
hiding other virtual characters of other users located in the first-type watching area; and
displaying other virtual characters of other users located in the second-type watching area.

According to one or more embodiments of the disclosure, provide a display control method, wherein the displaying an image of the virtual reality space based on a viewing angle of the second-type watching area comprises at least one of the following:
displaying the real or virtual image of the performer;
hiding other virtual characters of other users located in the first-type watching area; and
displaying other virtual characters of other users located in the second-type watching area.

According to one or more embodiments of the disclosure, provide a display control method, wherein
displaying a virtual interaction option when the virtual character of the user is located in the first-type watching area, wherein the virtual interaction option is used to interact with the real or virtual image of the performer; or
hiding the virtual interaction option when the virtual character of the user is located in the second-type watching area.

According to one or more embodiments of the disclosure, provide a display control method, wherein the virtual character of the user is located in the second-type watching area before responding to the first preset event, and the virtual character of the user is moved from the second-type watching area to the first-type watching area in response to the first preset event; and/or,
after displaying the image of the virtual reality space based on the viewing angle of the first-type watching area, the method further comprises: moving the virtual character from the first-type watching area to the second-type watching area in response to a second preset event.

According to one or more embodiments of the disclosure, provide a display control method, further comprising:
displaying a transition screen from one watching area to another when the virtual character of the user moves from the watching area to another, or displaying a preset screen.

According to one or more embodiments of the disclosure, provide a display control method, wherein the first preset event comprises: a preset gesture operation, an operation on a virtual device worn by the virtual character, an operation on a virtual option, or input of a preset audio instruction.

According to one or more embodiments of the disclosure, provide a display control method, wherein building a model of a watching area in the virtual reality space in advance, and setting at least one video stream corresponding to the model of the watching area; and
when the virtual character of the user is located in the watching area, displaying the image of the virtual reality space based on an orientation of the virtual character of the user.

According to one or more embodiments of the disclosure, provide a display control apparatus, comprising:
a display unit, configured to present a virtual reality space; and
a control unit, configured to in response to a first preset event, locate a virtual character of a user to a first-type watching area in the virtual reality space, wherein there is a stage in the virtual reality space, the stage is used to present a real or virtual image of a performer, and the first-type watching area is located on the stage, wherein
the display unit is further configured to display an image of the virtual reality space based on a viewing angle of the first-type watching area.

According to one or more embodiments of the disclosure, provide a terminal, comprising: at least one memory and at least one processor, wherein the at least one memory is configured to store program code, and the at least one processor is configured to call the program code stored in the at least one memory to perform the method according to any one of above.

According to one or more embodiments of the disclosure, provide a computer-readable storage medium for storing program code, wherein when the program code is executed by a processor, the processor is enabled to perform the method according to any one of above.

The above description is only a better embodiment of the present disclosure and a description of the technical principles applied. It should be understood by those skilled in the art that the scope of the disclosure covered by the present disclosure is not limited to technical solutions formed by specific combinations of the above technical features, but should also cover other technical solutions formed by any combination of the above technical features or their equivalent features without departing from the above disclosed idea. For example, the above features are interchangeable with (but not limited to) technical features with similar functions disclosed in the present disclosure.

Further, while the operations are depicted in a particular order, this should not be construed as requiring that the operations be performed in the particular order shown or in sequential order. Multitasking and parallel processing may be advantageous in certain environments. Again, while several specific implementation details are included in the above discussion, these should not be construed as limiting the scope of the present disclosure. Certain features described in the context of separate embodiments may also be implemented in combination in a single embodiment. Conversely, the various features described in the context of a single embodiment may also be implemented in multiple embodiments individually or in any suitable sub-combination.

Although the present subject matter has been described using language specific to structural features and/or methodlogical actions, it should be understood that the subject matter as defined in the appended claims is not necessarily limited to the particular features or actions described above. Rather, the particular features and actions described above are merely exemplary forms of claim fulfillment.

What is claimed is:

1. A display control method, comprising:
    presenting a virtual reality space;
    in response to a first event, locating a virtual character of a user to a first watching area, from a second watching area, in the virtual reality space, wherein the first event is one or more of an operation on a virtual device worn by the virtual character, an operation on a virtual option, or input of an audio instruction, wherein there is a stage in the virtual reality space, the stage is used to present a performer image of a performer, the first watching area is located on the stage, and the second watching area is located outside the stage; and
    displaying an image of the virtual reality space based on a viewing angle of the first watching area.

2. The method according to claim 1, wherein the virtual reality space comprises a virtual reality environment and a target image displayed in the virtual reality environment, wherein the target image is an image obtained based on a stage in a real space and the performer image of the performer; and
    the first watching area is located on the stage displayed in the target image.

3. The method according to claim 1, wherein
    the virtual reality space includes at least two watching areas, comprising the first watching area and the second watching area; and when the virtual character of the user is located in the second watching area, the image of the virtual reality space is displayed based on a viewing angle of the second watching area.

4. The method according to claim 1, wherein the displaying an image of the virtual reality space based on a viewing angle of the first watching area comprises at least one of the following:
    displaying the performer image of the performer;
    hiding other virtual characters of other users located in the first watching area; and
    displaying other virtual characters of other users located in the second watching area.

5. The method according to claim 3, wherein the displaying an image of the virtual reality space based on a viewing angle of the second watching area comprises at least one of the following:
    displaying the performer image of the performer;
    hiding other virtual characters of other users located in the first watching area; and
    displaying other virtual characters of other users located in the second watching area.

6. The method according to claim 1, further comprising:
    displaying a virtual interaction option when the virtual character of the user is located in the first watching area, wherein the virtual interaction option is used to interact with the performer image of the performer; and
    hiding the virtual interaction option when the virtual character of the user is located in the second watching area.

7. The method according to claim 3, wherein
    after displaying the image of the virtual reality space based on the viewing angle of the first watching area, the method further comprises: moving the virtual character from the first watching area to the second watching area in response to a second event.

8. The method according to claim 3, further comprising:
    displaying a transition screen from one watching area to another when the virtual character of the user moves from the watching area to another.

9. The method according to claim 1, wherein the first event further comprises: a gesture operation.

10. The method according to claim 3, further comprising:
    building a model of the first watching area in the virtual reality space before presenting the virtual reality space, and setting at least one video stream corresponding to the model of the first watching area; and
    when the virtual character of the user is located in the first watching area, displaying the image of the virtual reality space based on an orientation of the virtual character of the user.

11. A terminal, comprising:
    at least one memory and at least one processor, wherein the at least one memory is configured to store program code, and the at least one processor is configured to call the program code stored in the at least one memory to perform the display control method of claim 1.

12. The terminal according to claim 11, wherein the virtual reality space comprises a virtual reality environment and a target image displayed in the virtual reality environment, wherein the target image is an image obtained based on a stage in a real space and the real image of the performer; and
    the watching area is located on the stage displayed in the target image.

13. The terminal according to claim 11, wherein
    the virtual reality space includes at least two watching areas, comprising the first watching area and the second watching area; and when the virtual character of the user is located in the second watching area, the image of the virtual reality space is displayed based on a viewing angle of the second watching area.

14. The terminal according to claim 11, wherein the displaying an image of the virtual reality space based on a viewing angle of the first watching area comprises at least one of the following:
    displaying the performer image of the performer;
    hiding other virtual characters of other users located in the first watching area; and
    displaying other virtual characters of other users located in the second watching area.

15. The terminal according to claim 13 wherein the displaying an image of the virtual reality space based on a viewing angle of the second watching area comprises at least one of the following:
    displaying the performer image of the performer;

hiding other virtual characters of other users located in the first watching area; and displaying other virtual characters of other users located in the second watching area.

16. The terminal according to claim 11, the display control method further comprising:

displaying a virtual interaction option when the virtual character of the user is located in the first watching area, wherein the virtual interaction option is used to interact with the performer image of the performer; and hiding the virtual interaction option when the virtual character of the user is located in the second watching area.

17. The terminal according to claim 13, wherein after displaying the image of the virtual reality space based on the viewing angle of the first watching area, the display control method further comprises: moving the virtual character from the first watching area to the second watching area in response to a second event.

18. The terminal according to claim 13, the display control method further comprising:

displaying a transition screen from one watching area to another when the virtual character of the user moves from the watching area to another.

19. The terminal according to claim 13, the display control method further comprising:

building a model of the first watching area in the virtual reality space before presenting the virtual reality space, and setting at least one video stream corresponding to the model of the first watching area; and when the virtual character of the user is located in the first watching area, displaying the image of the virtual reality space based on an orientation of the virtual character of the user.

20. A non-transitory computer-readable storage medium for storing program code, wherein when the program code is executed by a processor, the processor is enabled to perform the display control method of claim 1.

* * * * *